United States Patent [19]

Sasaki et al.

[11] Patent Number: 5,255,335
[45] Date of Patent: Oct. 19, 1993

[54] OPTICAL FIBER COUPLER AND ITS MANUFACTURING METHOD

[75] Inventors: Hiroyuki Sasaki; Masato Shimamura, both of Tokyo; Yoshinori Namihira, Hachioji; Yoshihiro Yoshida, Omiya, all of Japan

[73] Assignees: Japan Aviation Electronics Industry Limited; Kokusai Denshin Denwa Co., Ltd., both of Tokyo, Japan

[21] Appl. No.: 868,522

[22] Filed: Apr. 15, 1992

[30] Foreign Application Priority Data

Apr. 23, 1991 [JP] Japan ................... 3-091904

[51] Int. Cl.⁵ ..................... G02B 6/00; G02B 6/36
[52] U.S. Cl. ................................................ 385/43
[58] Field of Search ........................... 385/39, 43

[56] References Cited

U.S. PATENT DOCUMENTS

| | | | |
|---|---|---|---|
| 4,822,126 | 4/1989 | Sweeny et al. | 385/43 |
| 5,066,087 | 11/1991 | Yamauchi et al. | 385/43 |
| 5,129,020 | 7/1992 | Shigematsu et al. | 385/43 |

Primary Examiner—Akm E. Ullah
Attorney, Agent, or Firm—Pollock, VandeSande and Priddy

[57] ABSTRACT

In an optical fiber coupler there is provided, in an optical coupling portion between cores of two partly fused together and extended optical fiber, an optical coupling control portion which has a refractive index different from those of claddings covering the cores.

4 Claims, 4 Drawing Sheets

OPTICAL FIBER COUPLER AND ITS MANUFACTURING METHOD

BACKGROUND OF THE INVENTION

The present invention relates to an optical fiber coupler which performs optical coupling between a plurality of cores through cladding at an optical coupling portion and relates more particularly to an optical fiber coupler of a wavelength division multiplex/demultiplex type employing such claddings. The invention also pertains a method for the manufacture of such an optical fiber coupler.

FIG. 1 shows a conventional optical fiber coupler. An optical coupling portion 11 includes two cores 13a and 13b in a common cladding 12 as depicted in FIG. 2 which is a cross-sectional view taken on the line 2—2 in FIG. 1. Reference numerals 15 and 16 denote optical fibers having cores continuous with both ends of the core 13a, and 17 and 18 denote optical fibers similarly having cores continuous with both ends of the core 13b. Usually, one optical fiber forming the optical fibers 15 and 16 and another optical fiber forming the optical fibers 17 and 18 have their intermediate portions fused together by heating, and the fused portion is elongated or stretched to form the optical coupling portion 11. In this way the optical fibers 15, 16 and 17, 18 are optically coupled together at the optical coupling portion 11.

A refractive index n along a straight line Ox passing through the centers of the cores 13a and 13b and perpendicular to the optical coupling portion 11 is high in the cores 13a, 13b as indicated by $N_{CR}$ in FIG. 3 and low and constant in the cladding 12 as indicated by $N_{CL}$. The characteristics of the optical fiber coupler are dependent upon parameters such as the difference between the refractive indexes of the cores 13a, 13b and the cladding 12, the diameters of the cores 13a and 13b, their spacing and the length of the optical coupling portion 11.

The conventional optical fiber coupler encounters a difficulty in reducing the length of the optical coupling portion 11. The branching ratio CR in the optical fiber coupler is expressed by the following equations:

$$CR = \cos^2(C)$$

$$C = \int_O^L c(z)dz,$$

where c(z) is a coupling coefficient in the z coordinates, z is a coordinate in the longitudinal direction of the optical coupling portion 11 and L is the length of the optical coupling portion 11.

It is well-known in the art that the coupling coefficient C needs to be large in the case of fabricating a coupler which is used as a so-called WDM (wavelength division multiplex/demultiplex) coupler in particular, a coupler whose branching ratio is narrow in the wavelength spacing of adjacent peaks, i.e. a highly wavelength dependent coupler. To make the coupling coefficient C large, it is necessary to maximize the coupling coefficient c(z). This can be accomplished by decreasing the core diameter in the optical coupling portion to facilitate the leakage of light from each core and by reducing the core spacing in that portion to facilitate the coupling of light. With too small a core diameter in the optical coupling portion as compared with the core diameter at the end of each optical fiber, however, the coupling coefficient c(z) becomes large but the discontinuity in the core diameter increases, causing an increase in an excess loss of the optical fiber coupler as a whole. Accordingly, it is customary in the prior art to increase the length L of the optical coupling portion 11 to make the coupling coefficient C large without abruptly decreasing the core diameter. Hence, the optical coupling portion 11 is long in the prior art optical fiber coupler.

Thus, no WDM coupler with a short optical coupling portion could have been implemented with the optical fiber coupler.

Besides, the conventional optical fiber coupler has relatively high polarization dependence. FIG. 4 shows the branching ratio vs. wavelength characteristic of the conventional optical fiber coupler measured using random light. As is evident from FIG. 4, the branching ratio is not 0% but is 7 to 8% at a wavelength of about 1534 nm, and not 100% but 90% or so at a wavelength of about 1470 nm. This is considered to be caused by the polarization dependence of the optical fiber coupler. The dependence of the branching ratio on polarization was ±9.3% at a wavelength of 1548 nm, which is relatively large.

To realize an optical fiber coupler of low wavelength dependence, it is necessary to minimize the coupling coefficient C in contrast to the case of increasing the wavelength dependence. This can be accomplished by maximizing the core diameter and the core spacing, but they cannot be made larger than those of an optical fiber which is used to form the optical fiber coupler. Accordingly, there is a limit to the reduction of the wavelength dependence of the optical fiber coupler. In a conventional optical fiber coupler which has a branching ratio of 50% at a wavelength of 1.3 μm, it is difficult to make its wavelength dependence 0.2% or below.

To obtain an optical fiber coupler of a wide wavelength band, it has also been proposed to employ a method wherein an optical fiber is fused and stretched and another optical fiber is fused and connected thereto and then stretched so that the core diameter of one optical fiber is smaller than the core diameter of the other optical fiber. With this method, however, it is difficult to manufacture optical fiber couplers of desired characteristics with a satisfactory yield of product.

SUMMARY OF THE INVENTION

It is therefore an object of the present invention to provide an optical fiber coupler of a WDM type with which it is possible to obtain a branching ratio of desired wavelength dependence.

Another object of the present invention is to provide a method for the manufacture of such an optical fiber coupler with a good production yield.

In the optical fiber coupler according to the present invention there is provided between claddings covering cores of at least two fused together and stretched optical fibers an optical coupling regulation or control portion which has a refractive index different from those of the claddings.

When the refractive index of the coupling control portion is selected higher than the refractive indexes of the claddings, the coupling coefficient between the two cores increases, whereas when the refractive index of the coupling control portion is selected lower than the refractive indexes of the claddings, the coupling coefficient decreases.

The optical fiber coupler manufacturing method according to the present invention includes a step wherein a plurality of optical fibers, at least one of which has the refractive index of an optical layer around its cladding made different from the refractive index of the cladding, are partly held in contact with each other lengthwise thereof and heat-fused together and then the fused portion is stretched or extended.

DESCRIPTION OF THE PREFERRED EMBODIMENTS

Figure 5:
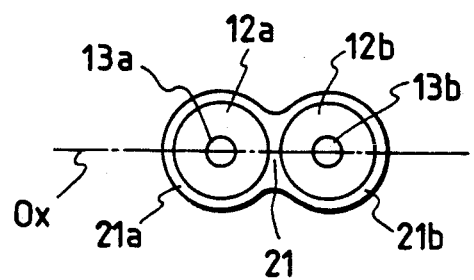
FIG. 5 is a cross-sectional view illustrating the optical fiber coupler according to an embodiment of the present invention.
Figure 6:
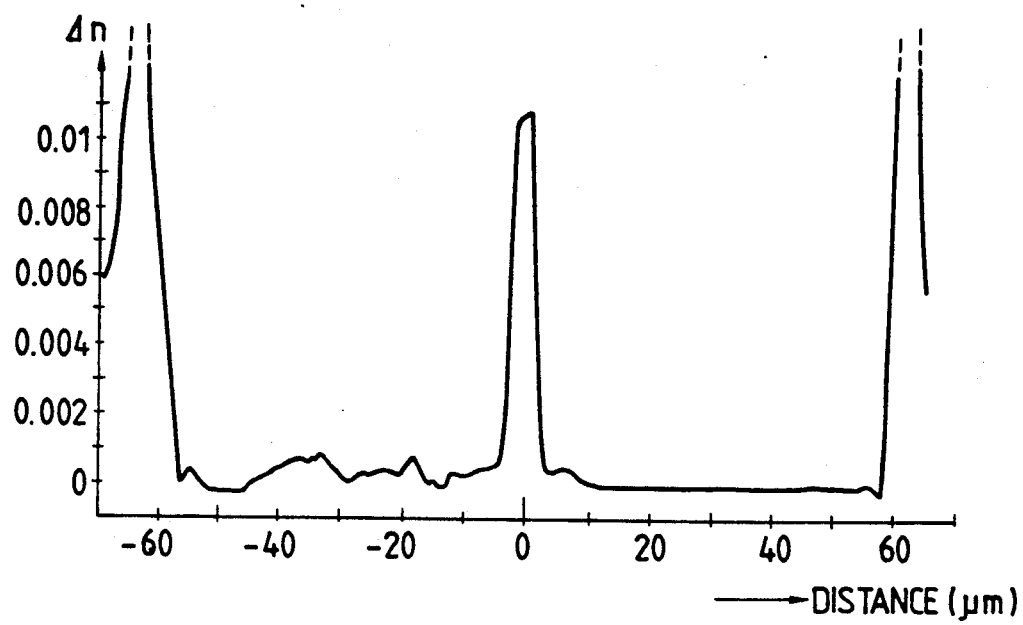
FIG. 6 is a graph showing the refractive index distribution of the optical fiber used in the coupler of FIG. 5.

FIG. 5 illustrate n section the optical coupling portion 11 of a WDM optical fiber coupler according to an embodiment of the present invention. Between a cladding 12a covering the core 13a and a cladding 12b covering the core 13b there is provided a coupling control portion 21 which has a refractive index different from those of the claddings 12a and 12b. In the FIG. 5 embodiment a pair of identical optical fibers, each of which has its cladding surrounded by an optical layer having a refractive index different from that of the cladding and has such a refractive index distribution as shown in FIG. 6 (in which the ordinate represents a refractive index difference $\Delta n$ between the optical layer and the cladding), are partly fused together and the fused portion is extended to form the optical fiber coupler. Consequently, the coupling control portion 21 is extended so that the claddings 12a and 12b are surrounded by optical layers 21a and 21b, respectively. In short, the coupling control portion 21 needs to be provided in an area defined by the opposed claddings 12a and 12b between the cores 13a and 13b.

Figure 7:
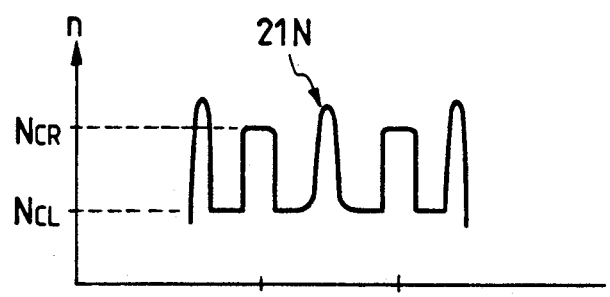
FIG. 7 is graph showing the refractive index distribution of the optical fiber coupler along the line Ox in FIG. 5.

FIG. 7 shows an example of the refractive index distribution along the straight line Ox passing through the centers of the cores 13a and 13b in FIG. 5, inferred from FIG. 6. (The actual diameter of the stretched optical coupling portion 11 was as small as 30 $\mu$m or so, and hence the refractive index distribution along the diameter could not be measured.) In FIG. 7, $N_{cl}$ represents the refractive indexes of the claddings 12a and 12b and $N_{cr}$ the refractive indexes of the cores 13a and 13b. In this embodiment the refractive index 21N of the coupling control portion 21 is higher than the refractive indexes $N_{cl}$ of the claddings 12a and 12b.

Figure 8:
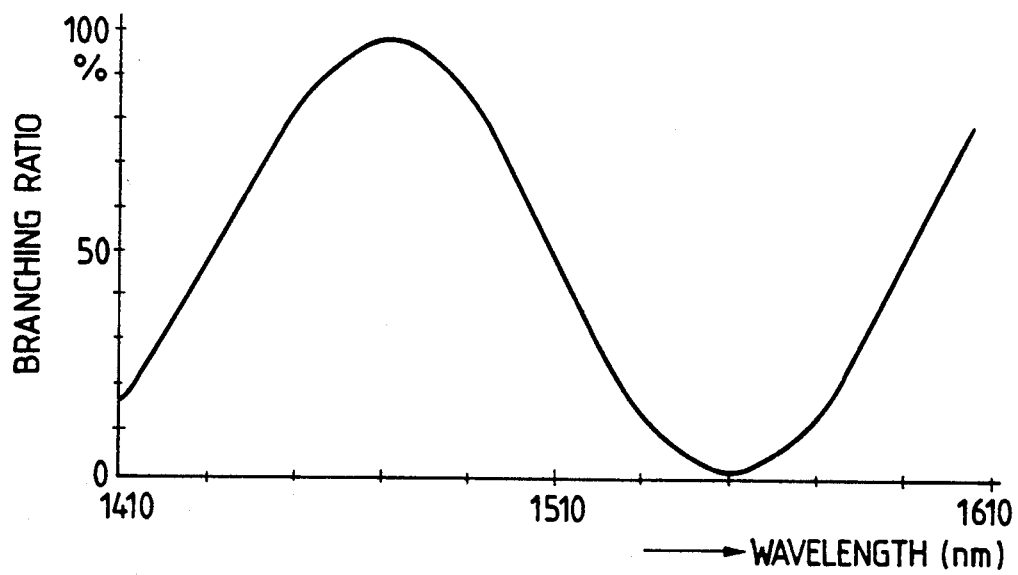
FIG. 8 is a graph showing the refractive index distribution of an optical fiber for use in the embodiment of FIG. 5.

With the provision of such a coupling control portion 21 that a refractive index higher than those of the claddings 12a and 12b, the optical coupling between the cores 13a and 13b is equivalently tighter than in the case where the coupling control portion 21 is not provided. Moreover, the coupling control portion 21 reduces the propagation wavelength of light therethrough and increases the effective coupling length (the length of the optical coupling portion converted to wavelength) as compared with that when the coupling control portion 21 is not provided. Thus, in the case of obtaining the same coupling coefficient as in the past, the length of the optical coupling portion 11 can be decreased. FIG. 8 shows the branching ratio-wavelength characteristic of the optical fiber coupler with respect to randomly polarized light. The optical coupling portion 11 of this optical fiber coupler is 9.8 mm long, whereas the optical coupling portion 11 of the conventional optical fiber coupler which has a peak at the same wavelength as in FIG. 8 is 16.5 mm.

Since the length of the optical coupling portion 11 can be reduced and since the coupling coefficient C can be made large, it is possible to construct a WDM optical fiber coupler in which the core diameter is not so small, that is, to such an extent as not to increase the excess loss and which has a branching ratio narrow in the wavelength spacing between its peaks, that is, has high wavelength dependence (i.e. a narrow wavelength band).

The coupling coefficient C can be controlled or adjusted by selecting the refractive index of the coupling control portion 21, the distance between the cores 13a and 13b, and so forth.

Figure 1:
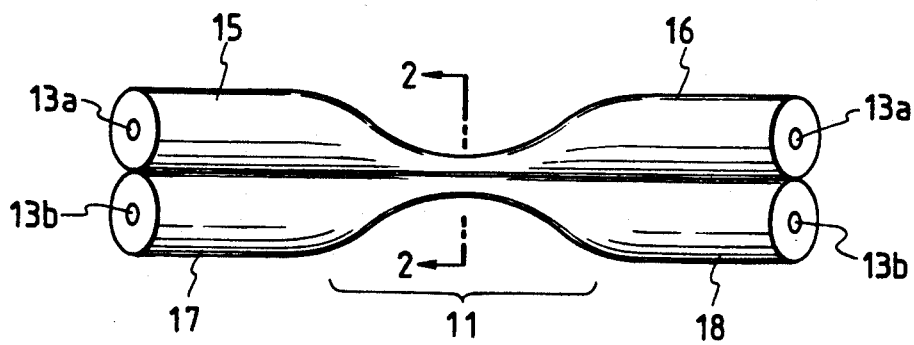
FIG. 1 is a diagram schematically showing a conventional optical fiber coupler.
Figure 2:
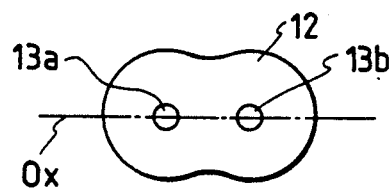
FIG. 2 is an enlarged cross-sectional view taken on the line 2—2 in FIG. 1.
Figure 3:
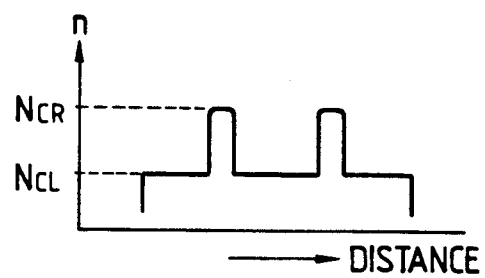
FIG. 3 is a graph showing the refractive index distribution along a line Ox in FIG. 2.
Figure 4:
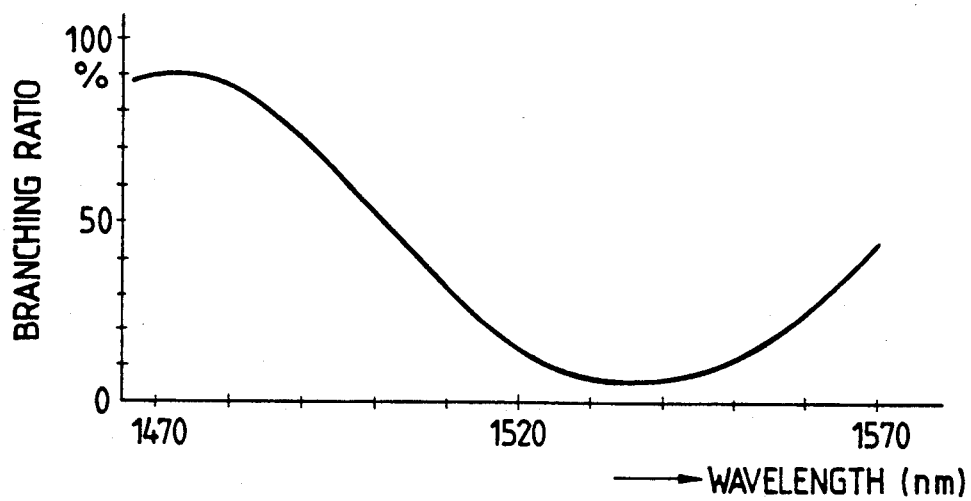
FIG. 4 is a graph showing the branching ratio-wavelength characteristic of the conventional optical fiber coupler.

The branching ratio of the optical fiber coupler of the present invention, shown in FIG. 8, is around 2% at a wavelength of 1550 nm and about 98% at 1470 nm. This demonstrates that the optical fiber coupler of the present invention is less polarization-dependent than the conventional optical fiber coupler depicted in FIG. 4. The polarization dependence of the branching ratio is $\pm 1\%$ at a wavelength of 1555 nm, which is appreciably better than in the prior art. The reason that the polarization dependence can be reduced is that the length of the optical coupling portion 11 can be decreased.

Figure 9:
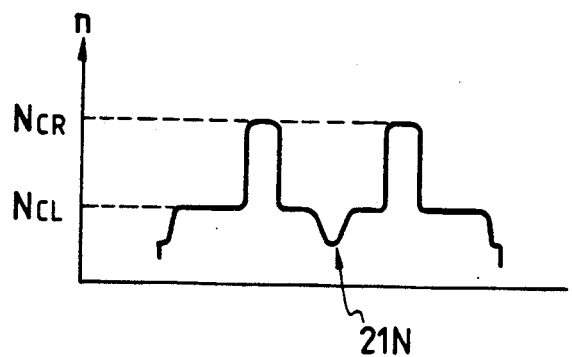
FIG. 9 is a graph showing the refractive index distribution in another embodiment of the present invention.

In the embodiment of FIG. 5 the refractive index 21N of the coupling control portion 21 between the cores 13a and 13b may also be chosen lower than the refractive indexes $N_{CL}$ of the claddings 12a and 12b as shown in FIG. 9. In this instance, the coupling coefficient C between the cores 13a and 13b becomes equivalently smaller than in the case where the coupling control portion 21 is not provided and the effective coupling length of the optical coupling portion 11 becomes short, hence an optical fiber coupler of low wavelength dependence is obtained. Thus, the degree of effective coupling between the cores 13a and 13b can be reduced irrespective of the size and shape of each optical fiber which is used to fabricate the optical fiber coupler.

Figure 10:
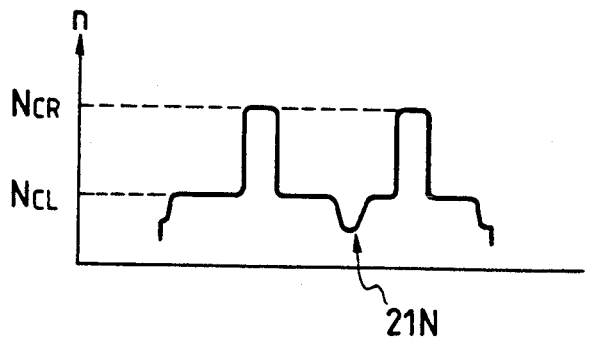
FIG. 10 is a graph showing the refractive index distribution in still another embodiment of the present invention.

The coupling control portion 21 may also be displaced from the center between the cores 13a and 13b, as shown in terms of the refractive index distribution in FIG. 10, by fusing together two optical fibers of different diameters having the optical layers 21a and 21b, respectively, and stretching them under the same condition or by fusing together two optical fibers of the same diameter having the optical layers 21a and 21b, respectively, and stretching them under different conditions. By locating the coupling control portion 21 off the center between the cores 13a and 13b as mentioned above, it is possible to obtain an optical fiber coupler which has an asymmetrical optical coupling portion, that is, an optical fiber coupler of a wide wavelength band.

Figure 11:
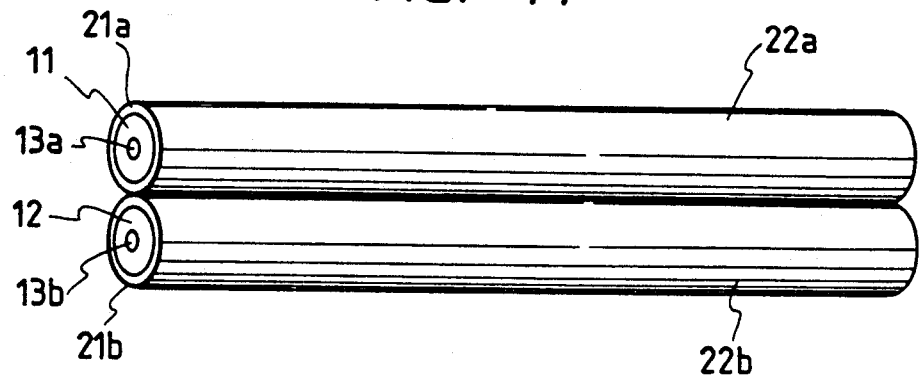
FIG. 11 is a diagram for explaining the optical fiber coupler manufacturing method of the present invention.

The manufacture of the optical fiber coupler which has the above-described coupling control portion 21 starts with the preparation of an optical fiber 22a which has the optical layer 21a formed around the outer periphery of the cladding 12a covering the core 13a and having a refractive index different from that of the cladding 12a, and an optical fiber 22b which similarly has the optical layer 21b formed around the outer periphery of the cladding 12b covering the core 13b and having a refractive index different from that of the cladding 12b, as shown in FIG. 11. The optical fibers 22a and 22b may be obtained by an ordinary optical fiber manufacturing method, or by doping existing optical fibers with an impurity to form in their outer surface layers the optical layers 21a and 21b of refractive indexes different from those of the claddings 12a and 12b. In the case of the latter, it is also possible to form the optical layers 21a and 21b only in those portions of the optical fibers which will ultimately form the coupling control portion 21 of the optical coupling portion 11 between the two cores 13a and 13b. In the case where the claddings 12a and 12b are formed of pure quartz, the optical layers 21a and 21b are doped with titanium or germanium or boron, depending on whether their refractive indexes are made high or low.

Such optical fibers 22a and 22b are held in contact with each other along their entire length and are partly fused together by heating, and the fused portion is stretched or elongated to form the optical coupling portion. The fusion and stretching or elongation of the optical fibers can be carried out by the same techniques as those for the fabrication of conventional optical fiber couplers of this kind.

While in the above the present invention has been described as being applied to an optical fiber coupler including two cores 13a and 13b in the optical coupling portion 11, the invention is also applicable to an optical fiber coupler having three or more cores in the optical coupling portion 11 and its fabrication can be done by the same method as described above. In this instance, coupling between the plurality of cores may be effected by using different refractive indexes in the coupling control portion between them and the coupling control portion may be omitted in some part. That is, during manufacture at least one of plurality of optical fibers may be one that has an optical layer formed therearound of a refractive index different from that of the cladding. Also in the case of fabricating an optical coupler with two optical fibers as shown in FIG. 11, it is possible to employ the one optical fiber 22a without the optical layer 21a and the other optical fiber 22b with the optical layer 21b.

As described above, according to the present invention, since a coupling control portion having a refractive index different from that of the claddings is provided between cores in the optical coupling portion, it is possible to obtain an optical fiber coupler which has a short optical coupling portion, a branching ratio of narrow wavelength spacing, or low polarization dependence, by making the coupling coefficient C large. It is also possible to obtain an optical fiber coupler of low wavelength dependence by selecting the coupling coefficient C small, and in this case, the optical fiber coupler is easy to manufacture and high in production yield.

It will be apparent that many modifications and variations may be effected without departing from the scope of the novel concepts of the present invention.

What is claimed is:

1. An optical fiber coupler of a WDM type having an optical coupling portion of reduced length for a given coupling coefficient, said WDM coupler being formed by fusing together at least two optical fibers and stretching them to form an optical coupling portion between said fibers, said WDM coupler including means permitting the required length of said optical coupling portion to be reduced comprising an optical coupling control portion disposed between and physically separating claddings covering cores of said at least two optical fibers in said optical coupling portion, said optical coupling control portion having a refractive index different from the refractive indexes of each of said claddings.

2. The optical fiber coupler of claim 1 wherein the refractive index of said optical coupling control portion is higher than the refractive indexes of said claddings.

3. The optical fiber coupler of claim 1 wherein the refractive index of said optical coupling control portion is lower than the refractive indexes of said claddings.

4. The optical fiber coupler of claim 1, 2 or 3 wherein said optical coupling control portion is part of an optical layer formed around the cladding of at least one of said two optical fibers.

* * * * *